United States Patent Office 3,477,194
Patented Nov. 11, 1969

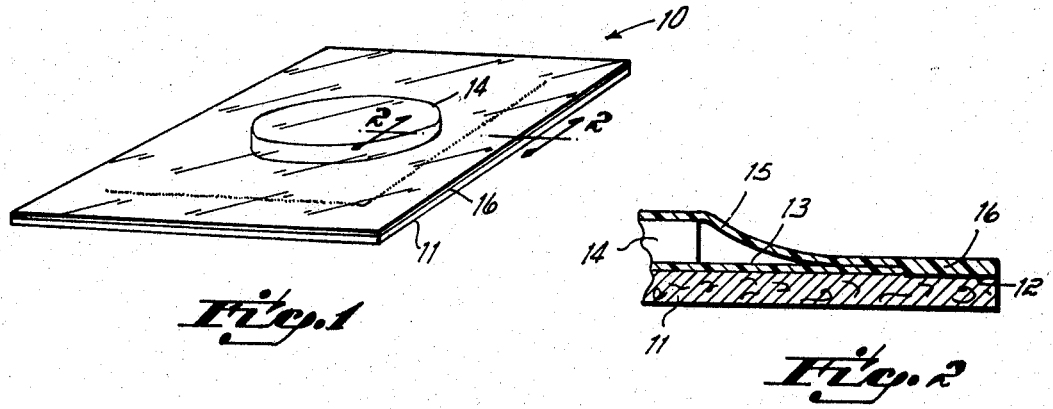
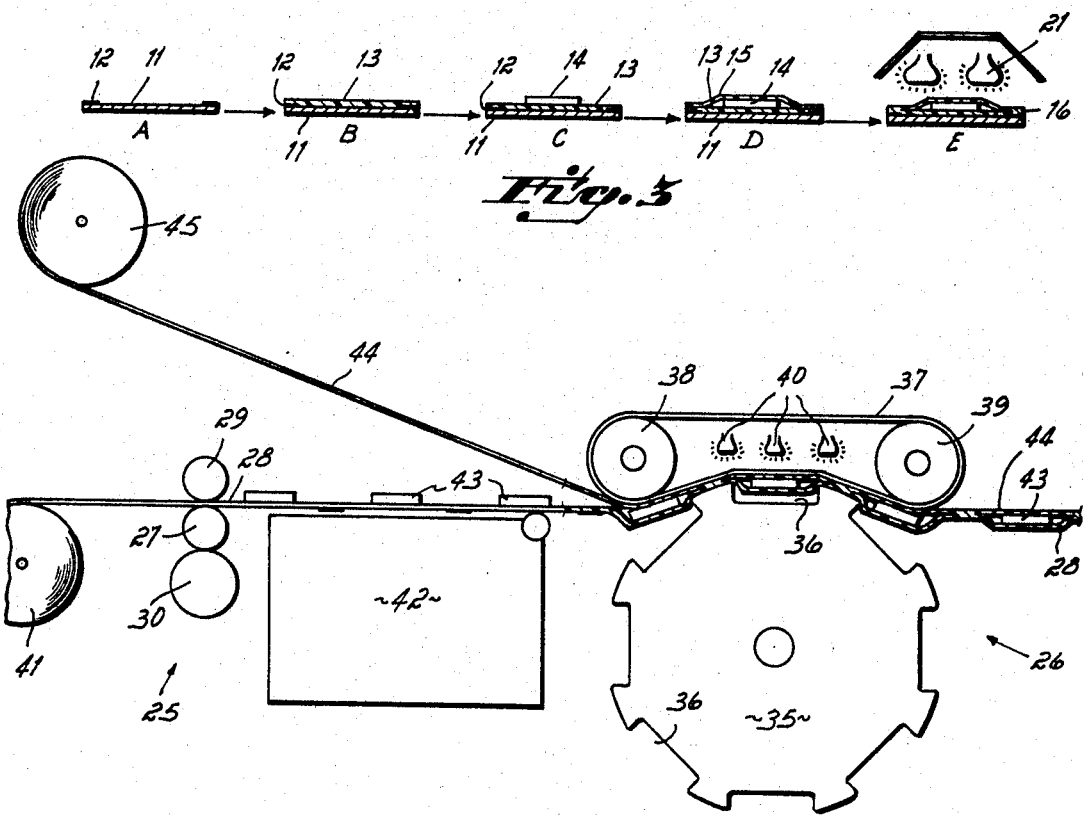

3,477,194
HEAT SEALED THERMOPLASTIC PACKAGE
Lester Corrsin, New Paltz, N.Y., assignor to U.S. Plywood-Champion Papers Inc., a corporation of New York
Filed Sept. 28, 1966, Ser. No. 582,730
Int. Cl. B65b 9/04, 51/10
U.S. Cl. 53—33                                                    3 Claims

ABSTRACT OF THE DISCLOSURE

Forming a package of thermoplastic films which must be sealed together by applying a pattern of radiation-absorbing material to a surface, bringing the films into contact with the surface, and radiating the material so that the heat absorbed by the radiation is conducted to said films to fuse and seal said films in the pattern of said material.

---

This invention relates to welding by infrared radiation and more particularly the invention is directed to the joining of sheets of thermoplastic materials by radiating them in the presence of any material which will absorb the infrared radiation and thereby increase its temperature.

The invention is particularly useful in packaging articles between thermoplastic sheets and will be described in that context.

In joining two or more thermoplastic sheets, it is presently the practice to apply heat and pressure to the sheets as by means of a thermal element such as nichrome wire. Among the disadvantages of this practice are the fact that it requires rather precise timing to assure fusion on the one hand and to avoid rupture on the other, the fact that there is a criticality as to the type of material and its thickness, and the fact that it is somewhat inflexible in the formation of and changing of the configuration of the seal.

The present invention employs the principle that certain materials such as carbon will absorb infrared rays and become hot. This principle is used to generate heat in a predetermined pattern or configuration and to use the heat so generated to fuse together articles brought into contact with the heated infrared absorbing material. As it relates to packaging, the invention contemplates bringing thermoplastic films or sheets together an in contact with an infrared absorbing material, with an article between the sheets, and the radiating of the absorbing material to raise its temperature, thereby fusing the films with the articles sandwiched between them.

There are a number of advantages to be derived from the application of the invention to the packaging field over the present practices. Important among these are the wide variety of configurations of sealed areas which can be produced and the ease with which they can be created and varied. Further, the invention admits of a variety of modes of use whereby it can be adapted to a variety of packaging problems not easily solved or even possible to solve through existing sealing methods. This variety is derived in part from the fact that the invention does not require the application of pressure to the area to be sealed other than that needed to bring the films together in thermally conducting contact with each other and with the infrared absorbing material.

As examples of the diverse modes of employing the invention, it can be noted that if a carbon containing ink is printed on one film, that film can be joined to another film in the area of the printing simply by bringing the films into contact adjacent the printed areas and radiating with infrared. Alternatively, paperboard can be printed and coated with a thermoplastic film to provide a support for an article and an overlying film can be applied to the board. When the coated board and film are radiated, the coating and films will seal to each other in the area overlying the carbon containing printing. Still another mode involves the formation of a configurated absorbing material on a support which is located in proximity to a source of infrared. Films to be joined are passed between the source and the infrared absorbing material and in thermal contact with the absorbing material to effect their seal.

The invention is also applicable to the joining of other fusible materials by bringing them together and in contact with infrared absorbing material and radiating them with infrared of sufficiently high intensity to effect their fusion and welding.

The several features of the invention will become more readily apparent from the following detailed description taken in conjunction with the accompanying drawings in which:

FIG. 1 is a perspective view of a package formed in accordance with the present invention, FIG. 2 is a cross sectional view thereof taken along lines 2—2 of FIG. 1, FIG. 3 is a diagrammatic flow diagram, partly in section illustrating a sequence of steps used in the manufacture of the package, and FIG. 4 is a diagrammatic side elevational view, partly in section, illustrating an alternative mode in employing the invention.

Referring to FIGS. 1 and 2, a package formed in accordance with the invention is illustrated at 10 and is constituted by a paperboard sheet 11 which has been printed with a carbon containing substance 12 in a continuous pattern around the periphery of the board. The board is coated with a thermoplastic material 13, such as polyethylene, after printing to form what is known in the art as poly-coated board. An article 14 is placed within the printed border of the board 11 and is overlaid with a film of thermoplastic material 15. The coating 13 and the film 15 are welded throughout the area overlying the infrared absorbing printing 12 as indicated at 16.

The steps of the process of manufacturing a package of FIGS. 1 and 2 are illustrated in FIG. 3. The paperboard support 11 is printed to provide the border of infrared absorbing material 12 as indicated in step A. At step B, the board is coated with the thermoplastic material 13. At step C, an article is placed on the board within the border 12. At step D, a thermoplastic film is placed over the board and article, gravitational force bringing the borders of the film and board together as at 20. At step E, the materials are radiated by a source of infrared radiation 21 for a few seconds during which the temperature of the infrared absorbing material 12 is raised to the level necessary to effect the fusion of the thermoplastic material to form the welded area 16.

An alternative form of the use of the invention is illustrated in FIG. 4. In the form illustrated in FIG. 4, two webs of thermoplastic material are fed into the apparatus of FIG. 4 to effect the continuous packaging of articles. The apparatus includes a printer 25 which applies a predetermined pattern of infrared absorbing material to one of the thermoplastic films and apparatus 26 for bringing the two films together and radiating them with infrared to heat the infrared absorbing material to the extent required to effect the fusion and welding of the films adjacent the printed areas.

The printing device is conventional and includes a printing roller 27 which prints on a web 28 fed between it and a pressure roller 29. The printing roller receives its pattern of infrared absorbing ink from the roller 30. The apparatus 26 includes a roller 35 which has a series of pockets 36 around its periphery, the pockets being of sufficient depth to receive the web and article to be packaged without crushing the article. Overlying the roller 35 is an endless pressure belt 37 passing over rollers 38 and 39. The belt is provided to bring the films into intimate thermally conducting contact with each other during the time of radiation. Between the upper and lower flights of the belt is a source of infrared constituted by the lamps 40. The belt 37 is formed of a material which is transparent and which has the ability to resist adhering to the fused thermoplastic films. One such suitable material is poly tetrafluoroethylene (Teflon). The roller 39 may be formed as a hollow drum through which a coolant is circulated if in the particular application of the process it is found necessary to provide means for cooling the belt 37.

In the operation of the apparatus of FIG. 4, the web 28 is fed from a supply roll 41 through the printing stack 25 during which a pattern of infrared absorbing material is printed onto the bottom surface of the web 28. The web is passed over a supporting table 42 during which articles 43 are placed on the web either automatically or by hand, the articles being disposed within the confines of the individual printed configurations on the web. A cover web 44 is fed from a supply roll 45 into the nip formed between the roller 35 and the belt 37. The pressure in the nip is sufficient to hold the films in good thermally conducting contact. While in the nip, the films are radiated with infrared rays from the lamps 40, the rays being absorbed by the infrared absorbing material printed on the web 28. The temperature of the infrared absorbing material is raised to the degree necessary to effect the fusing and welding of the thermoplastic material overlying the areas of the infrared absorbing material, thereby sealing the articles between the two plies of thermoplastic material. As indicated, the roller 35 may be recessed in order to accommodate the articles as they pass through the nip without applying a crushing pressure to the articles. Since the pressure applied in the nip by the belt 37 is rather light, the drum may simply be covered by a sponge-like layer of sufficient thickness to accommodate the articles.

The belt and/or drum may be provided with transverse or longitudinal ribs which coincide with the area being sealed. The pressure of the ribs on the fused plastic will cause lines of weakness or actual separation, thereby permitting the formation of separate packages during the sealing operation.

The invention contemplates the use of absorbers other than carbon containing inks. For example, another embodiment of the invention embraces using as an absorber a visually transparent radiation absorber that is selective to radiation in a certain range of wave lengths which will be referred to as a selective absorber. A coating containing the selective absorber is formed in a predetermined pattern on one of the films, preferably at the interface between the two films to be heat sealed. Thereafter the two films with such coating between them are subjected to radiation from a source that emits radiation in the effective range of wave lengths that the coating is capable of absorbing.

More specifically, two transparent films, or substantially transparent films, are sealed together by employing a substantially visually transparent radiation absorber which selectively absorbs radiation in a wave length range to which the films are transparent, thus causing concentration in heat in areas where such absorber has been applied, and thereby effecting the sealing. One such selective absorber is polybutadiene which absorbs radiations at a wave length of 10.6 microns. Similarly, copolymers of polybutadiene with styrene acrylonitrile exhibit selective absorption properties. A latex containing from 5–20% total solids of polybutadiene alone or with its copolymers may be prepared and placed between two transparent polyethylene films in the areas to be sealed and the entire structure is exposed to radiation from a carbon dioxide laser producing radiation at a wave length of 10.6 microns for a time sufficient to achieve sealing.

It may be desired to form a package from plastic films where one film is a pigmented film and the other film is visually transparent. In such case, the radiation may not be capable of satisfactorily penetrating the pigmented film and causing an adjacent radiation absorber to absorb sufficient heat to cause the desired sealing. In such case a layer of material which is capable of absorbing radiation is interposed between the two films in the areas to be sealed and the package is radiated from the side of the transparent film. By way of example, pigmented polyethylene 3 mils thick is heat-sealed to transparent polypropylene according to the present invention. The polyethylene film is coated in the areas to be sealed with a radiation absorber which will selectively absorb radiation in the near infrared from 1 to 3 microns. An incandescent source such as a tungsten filament provides such radiation.

The selective absorber is made by preparing an aqueous suspension having in the range from 10% to 15% total solids by mixing a suitable amount of gypsum

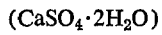

$$(CaSO_4 \cdot 2H_2O)$$

with a suitable amount of water using calcium oleate as a dispersant. From 0.1 to 0.3% by weight of the oleate is used, based on the weight of the weight of the gypsum.

The coating is placed on the areas to be sealed and dried. The article to be packaged is placed at the appropriate point on the polyethylene film. The polypropylene film is laid thereover, preferably in such a manner as to bring the polypropylene directly into contact with the dried residue of the coating previously prepared, applied, and dried. The polypropylene film is disposed between the pigmented polyethylene and the infrared source.

The above structure is exposed to infrared radiation for a time sufficient for the calcium sulfate, which effectively absorbs radiation in the near infrared from 1 to 3 microns, to absorb sufficient heat energy from the incandescent source to bring the sealing of the polypropylene to the polyethylene. The sealed areas, being on a background of pigmented polyethylene, present little or no visual indication of the coating residue having been placed thereon. This residue is largely crystal, and not adhesive, in nature.

1. The method of mounting an article on a board comprising the steps of,
    applying a pattern of infrared absorbing material to a surface of said board,
    coating said surface of said board with a thermoplastic material,
    placing said article on said board adjacent said absorbing mateiral,
    placing a film of thermoplastic material over said article and in contact with said coating in the areas overlying said absorbing material, and
    radiating said absorbing material with infrared rays.

2. The method of packaging an article comprising the steps of,
    placing said article between two sheets of thermoplastic material which are transparent to radiation,
    applying to a surface a closed pattern of polybutadiene which absorbs radiation at a wave length of 10.6 microns,
    bringing said sheets in juxtaposition to said surface with said article located within said pattern of polybutadiene,
    and radiating said absorbing material with a carbon dioxide laser producing a radiating at a wave length of 10.6 microns.

3. A method of mounting an article on a board comprising the steps of applying a pattern of polybutadiene to a surface of said board, said polybutadiene characterized by its ability to absorb radiation at a wave length of 10.6 microns, coating said surface of said board with a thermoplastic material, placing said article on said board adjacent said polybutadiene, placing a film of thermoplastic material over said article and in contact with said cating in the areas overlying said polybutadiene, and radiating said polybutadiene with a carbon dioxide laser producing a radiating at a wave length of 10.6 microns.

References Cited

UNITED STATES PATENTS

| 2,989,827 | 6/1961 | Groth | 53—22 |
| 3,018,881 | 1/1962 | Wall. | |
| 3,189,702 | 6/1965 | Wall et al. | 53—28 X |
| 3,358,829 | 12/1967 | Smith et al. | |
| 3,188,259 | 6/1965 | Leger | 156—380 |
| 3,247,041 | 4/1966 | Henderson | 156—272 |

THERON E. CONDON, Primary Examiner

NEIL ABRAMS, Assistant Examiner

U.S. Cl. X.R.

53—39; 156—272; 206—80; 229—48; 331—94.5